United States Patent
Zhang

(10) Patent No.: US 12,512,665 B2
(45) Date of Patent: Dec. 30, 2025

(54) FORCED CURRENT SHARING CIRCUIT, CHIP, MOTHERBOARD AND ELECTRONIC DEVICE

(71) Applicant: SUZHOU METABRAIN INTELLIGENT TECHNOLOGY CO., LTD., Jiangsu (CN)

(72) Inventor: Yubin Zhang, Jiangsu (CN)

(73) Assignee: SUZHOU METABRAIN INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 19/116,301

(22) PCT Filed: Jun. 6, 2024

(86) PCT No.: PCT/CN2024/097867
§ 371 (c)(1),
(2) Date: Mar. 27, 2025

(87) PCT Pub. No.: WO2025/066271
PCT Pub. Date: Apr. 3, 2025

(65) Prior Publication Data
US 2025/0266677 A1    Aug. 21, 2025

(30) Foreign Application Priority Data
Sep. 25, 2023 (CN) .......... 202311237728.1

(51) Int. Cl.
*H02H 7/22* (2006.01)
*G05F 3/08* (2006.01)

(52) U.S. Cl.
CPC .............. *H02H 7/222* (2013.01); *G05F 3/08* (2013.01)

(58) Field of Classification Search
CPC .................................. H02H 7/222; G05F 3/08
See application file for complete search history.

(56) References Cited

U.S. PATENT DOCUMENTS

| 10,200,030 B2* | 2/2019 | Wang ................. H03K 17/6874 |
| 2007/0001658 A1* | 1/2007 | Nguyen ............. H02M 3/1584 323/290 |
| 2007/0211507 A1* | 9/2007 | Ilic ....................... H02M 3/1584 363/132 |
| 2015/0370298 A1* | 12/2015 | Henzler .............. G06F 13/4221 713/310 |

FOREIGN PATENT DOCUMENTS

| CN | 113437876 A | 9/2021 |
| CN | 116995640 A | 11/2023 |

* cited by examiner

Primary Examiner — Harry R Behm
(74) Attorney, Agent, or Firm — IPro, PLLC

(57) ABSTRACT

The present disclosure provides a forced current sharing circuit, chip, motherboard, and electronic device, and relates to the technical field of power supply technology. A first terminal of each phase in the multi-phase coupled device is connected to an output terminal of a current channel; a second terminal of each phase in the multi-phase coupled device is connected to second terminals of other phases in parallel and then connected to a load; and a coupling coefficient and a mutual inductance between each two phases in the multi-phase coupled device are 1, so that currents at the first terminal and the second terminal of each phase in the multi-phase coupled device are equal to currents at first terminals and the second terminals of other phases.

20 Claims, 5 Drawing Sheets

FORCED CURRENT SHARING CIRCUIT, CHIP, MOTHERBOARD AND ELECTRONIC DEVICE

CROSS-REFERENCE TO RELATED APPLICATION

The present disclosure claims the priority of Chinese patent application filed in CNIPA on Sep. 25, 2023, with the present disclosure number of 202311237728.1 and the present disclosure name of "Forced Current Sharing Circuit, Chip, Motherboard and Electronic Device", the entire contents of which are incorporated into the present disclosure by reference.

FIELD

The present disclosure relates to the technical field of power supply, in particular to a forced current sharing circuit, a chip, a motherboard and an electronic device.

BACKGROUND

With the rapid development of cloud computing, artificial intelligence, and recent large-scale artificial intelligence model (such as Chat Generative Pre-trained Transformer, abbreviated as ChatGPT), the power of main chips such as CPU (Central Processing Unit) and GPU (graphics processing unit) is constantly increasing, which makes the power supply current gradually increase, and also brings some difficulties to the heat dissipation and layout of the board. When a large current flows through a printed circuit board (PCB) with a slightly larger impedance, it will produce greater heat loss.

At present, different voltage levels of Efuse (electronic fuse) will be designed for PCB boards to ensure the stable supply of power, and because of the increase of current, in the design, multi-phase Efuse is usually used in parallel to ensure the current flow capacity. However, in the present design, the passive current sharing of multi-phase Efuse can only be realized by wiring layout, and current sharing cannot be forced actively.

However, the passive current sharing has some problems, such as different flow paths caused by the manufacturing process of Efuse or product batches, individual Efuse exceeding the working limit are overheated and stop working, and other parallel Efuse needs to bear their load current, which leads to further deterioration of the working situation, and even leads to the failure of surrounding devices, such as the failure of capacitors and fire, which eventually brings the risk of burning boards.

SUMMARY

In view of the above problems, the present disclosure is submitted to provide a forced current sharing circuit, chip, motherboard and electronic device that solves or partially solves the above problems.

The embodiments of the present disclosure provides a forced current sharing circuit, including: a multi-phase coupled device and a plurality of parallel current channels; wherein, a first terminal of each phase in the multi-phase coupled device is connected to an output terminal of a current channel;

a second terminal of each phase in the multi-phase coupled device is connected to second terminals of other phases in parallel and then connected to a load; and a coupling coefficient and a mutual inductance between each two phases in the multi-phase coupled device are 1, so that currents at the first terminal and the second terminal of each phase in the multi-phase coupled device are equal to currents at first terminals and the second terminals of other phases.

In some embodiments of the present disclosure, the multi-phase coupled device includes a multi-phase coupled transformer or a multi-phase coupled inductor;

winding coils of all phases in the multi-phase coupled transformer share a single magnetic core;

the winding coils of every two phases in the multi-phase coupled transformer are coupled with opposite polarity, and the coupling coefficient and the mutual inductance between the winding coils of every two phases are both 1; or, inductance coils of all phases in the multi-phase coupled inductor share a single magnetic core; and the inductance coils of every two phases in the multi-phase coupled inductor are coupled with opposite polarity, and the coupling coefficient and the mutual inductance between inductance coils of every two phases are 1.

In some embodiments of the present disclosure, a first terminal of winding coil of each phase in the multi-phase coupled transformer is connected to an output terminal of a current channel; a second terminal of a winding coil of each phase in the multi-phase coupled transformer is connected to the load after being connected in parallel with second terminals of winding coils of other phases, and a first terminal of a (n−1)th phase winding coil and a second terminal of a nth phase winding coil are of the same polarity, where n is more than or equal to 2; or, a first terminal of an inductance coil of each phase in the multi-phase coupled inductor is connected to an output terminal of a current channel; and a second terminal of the inductance coil of each phase in the multi-phase coupled inductor is connected to the load after being connected in parallel with the second terminals of inductance coils of other phases, and a first terminal of a (n−1)th phase inductance coil and a second terminal of a nth phase inductance coil are of the same polarity, where n is more than or equal to 2.

In some embodiments of the present disclosure, the coupling coefficient and the mutual inductance of the winding coils of every two phases in the multi-phase coupled transformer are both 1, so that a self-inductance of winding coil of each phase is the same; or, the coupling coefficient and the mutual inductance of the inductance coil of every two phase in the multi-phase coupled inductor are both 1, so that a self-inductance of the inductance coil of each phase is the same.

In some embodiments of the present disclosure, when the forced current sharing circuit is in a dynamic working state, and when the current of any current channel connected by any phase changes, the other phases all induce a electromotive force, so that the current output to the load changes at the same time, thereby making the current of the first terminal and the second terminal of each phase are equal.

In some embodiments of the present disclosure, when the forced current sharing circuit is in a static working state, each phase in the multi-phase coupled device increases a loop impedance of the current channel connected to each phase, and passively adjusts and reduces an uneven current ratio of a plurality of current channels.

In some embodiments of the present disclosure, when the forced current sharing circuit is in a static working state, each phase in the multi-phase coupled device increases a loop impedance of the current channel connected to each phase to prevent a power limit from being reached.

In some embodiments of the present disclosure, the forced current sharing circuit further includes a plurality of electronic fuses, one of which is arranged in a current channel;
the first terminal of each phase in the multi-phase coupled device is connected to an output terminal of an electronic fuse, and an input terminal of each electronic fuse receives a current output by a preceding circuit; and
the second terminal of each phase in the multi-phase coupled device is connected to the load after being connected in parallel with the second terminals of other phases.

In some embodiments of the present disclosure, the forced current sharing circuit further includes a current detection unit, a current source, a discharge resistor and a plurality of discharge units;
the current detection unit is connected to the current source and configured to detect a current output to the load and send a control signal to the current source according to the detected current output to the load;
the current source is respectively connected to a plurality of discharge units and the discharge resistors, and is configured to inject currents of different magnitudes into the discharge resistor according to the control signal; and
one of the discharge units is connected in parallel with one phase of the multi-phase couple device, and is configured to discharge or maintain energy stored in a phase parallel with the discharge unit according to the magnitude of the current injected into the discharge resistor.

In some embodiments of the present disclosure, a negative terminal of the current source is grounded, and a positive terminal of the current source is respectively connected to a second terminal of each of the plurality of discharge units and a first terminal of the discharge resistor;
a first terminal of each of the plurality of discharge units is connected to an input terminal of a respective connected phase; and
a second terminal of the discharge resistor is grounded.

In some embodiments of the present disclosure, when the forced current sharing circuit is in a normally charged state, the current output to the load detected by the current detection unit is normal, and the current detection unit sends a first control signal to the current source;
the current source receives the first control signal, and injects a current of a preset magnitude into the discharge resistor, so that each discharge unit keeps the energy stored in the phase parallel with the discharge unit.

In some embodiments of the present disclosure, when the forced current sharing circuit is in an abnormal power-off state, the current output to the load detected by the current detection unit is abnormal, and the current detection unit sends a second control signal to the current source; the current source receives the second control signal and reduces the magnitude of the current injected into the discharge resistor, so that each discharge unit discharges the energy stored in the phase parallel with the discharge resistor.

In some embodiments of the present disclosure, the current source injects the current of the preset magnitude into a plurality of the discharge resistors, so that a magnitude of a voltage at the first terminal of the discharge resistor is equal to a voltage at first terminals of all phases in the multi-phase coupled device, and each discharge unit keeps the energy stored in the phase parallel with the discharge unit.

In some embodiments of the present disclosure, the current source reduces the magnitude of current injected into the plurality of the discharge resistors, so that a magnitude of a voltage of the first terminal of the discharge resistor is smaller than a voltage at first terminals of all phases in the multi-phase coupled device, and each discharge unit discharged the energy stored in the phase parallel with the discharge unit.

In some embodiments of the present disclosure, the forced current sharing circuit further includes: a precision resistor;
the second terminals of all phases in the multi-phase coupled device are connected in parallel and then connected to a first terminal of the precision resistor, and a second terminal of the precision resistor is connected to an input terminal of the load;
the current detection unit detects the current output to the load by using the precision resistor, and generates a corresponding control signal according to whether the current is normal or abnormal, and sends the control signal to the current source.

In some embodiments of the present disclosure, the releasing unit includes a diode;
an anode of the diode is connected to an input terminal of a parallel connection phase;
a cathode of the diode is respectively connected to the positive terminal of the current source and the first terminal of the discharge resistor.

In some embodiments of the present disclosure, the current source includes a voltage-controlled current source.

In the second aspect, the embodiments of the present disclosure provides a chip, wherein a power supply structure of the chip adopts the forced current sharing circuit according to any one of the first aspect.

In the third aspect, the embodiments of the present disclosure provides a motherboard, wherein the motherboard includes the forced current sharing circuit according to any one of the first aspect;
the forced current sharing circuit is configured to force current sharing the output current of a power supply terminal in the motherboard to meet requirements of the power supply current of chips in the motherboard.

In the fourth aspect, the embodiments of the present disclosure provides an electronic device, wherein the electronic device includes the forced current sharing circuit according to any one of the first aspect;
the forced current sharing circuit is configured to force current sharing the output current of a power supply terminal in a motherboard in the electronic device to meet requirements of the power supply current of chips in the motherboard.

The forced current sharing circuit provided in the present disclosure includes: a multi-phase coupled device and multiple current channels connected in parallel; a first terminal of each phase in the multi-phase coupled device is connected to an output terminal of one current channel; and a second terminal of each phase in the multi-phase coupled device is connected in parallel with the second terminals of the other phases and then connected to a load.

In a multi-phase coupled device, the coupling coefficient and mutual inductance between every two phases are both 1, indicating perfect coupling with no leakage flux. Consequently, when the current flowing through any one phase changes, the currents in all other phases will change simultaneously, ensuring that the currents at the first and second terminals of each phase in the multi-phase coupled device are equal to those at the corresponding terminals of the other phases.

The forced current-sharing circuit proposed in the present disclosure can actively enforce current sharing, thereby avoiding the issue where individual Efuses may exceed their operational limits due to manufacturing processes or product batch variations, leading to overcurrent, overheating, and eventual cessation of operation. With this circuit, the current flowing through all Efuses does not exceed the limit, naturally preventing overheating issues and the potential failure of surrounding components. This avoids accidents such as thermal damage and enhances the stability of the board's operation.

Moreover, the forced current sharing circuit proposed in the present disclosure does not require additional control logic or control circuits, resulting in a simple circuit structure. Since it solely relies on the characteristics of passive components, it is less prone to errors. This not only improves the power cycling and efficiency of the forced current sharing circuit but also enhances the reliability of the forced current sharing circuit.

BRIEF DESCRIPTION OF THE DRAWINGS

In order to more clearly explain the embodiments of the present disclosure or the technical solution in the prior art, the appended drawings needed to be used in the description of the embodiments or the prior art will be briefly introduced below. Apparently, the appended drawings in the following description are only the embodiments of the present disclosure. For persons skilled in the art, other drawings can be obtained according to the provided drawings without expenditure of creative labor.

In order to explain the technical solution of the embodiments of the present disclosure more clearly, the appended drawings needed in the description of the embodiments of the present disclosure will be briefly introduced below. Apparently, the appended drawings in the following description are only some embodiments of the present disclosure. For persons skilled in the art, other drawings can be obtained according to these drawings without expenditure of creative labor.

DETAILED DESCRIPTION

In the following, the technical solution in the embodiments of the present disclosure will be clearly and completely described with reference to the appended drawings in the embodiments of the present disclosure. Apparently, the described embodiments are a part of the embodiments of the present disclosure, but not the whole embodiment. Based on the embodiments in the present disclosure, all other embodiments obtained by persons skilled in the art without expenditure of creative work belong to the protection scope of the present disclosure.

At present, different voltage levels of Efuse (electronic fuse) will be designed for PCB boards to ensure the stable supply of power, and because of the increase of current, multi-phase Efuse is usually used in parallel to ensure the current flow capacity.

Figure 1:
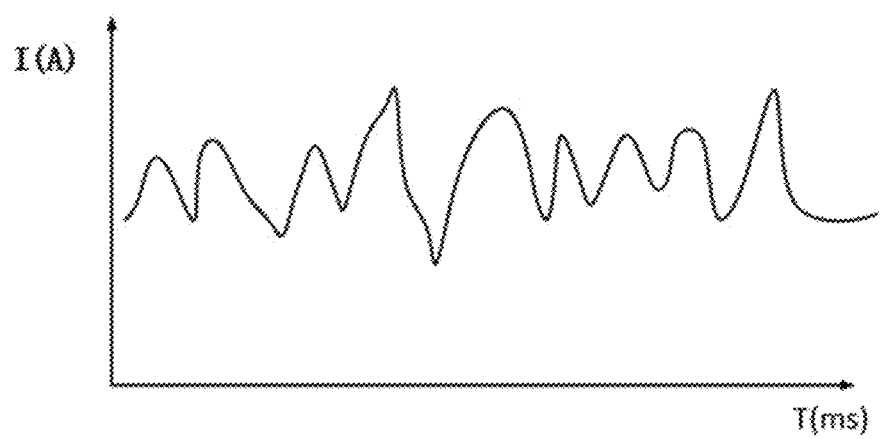
FIG. 1 is a schematic diagram of a working current waveform under a current conventional chip power supply structure.

The inventors have further discovered that due to manufacturing processes or product batch variations, it is impossible to ensure that each Efuse or MOS has the same Rdson (on-resistance) when turned on. Existing Efuses operate in the saturation region, meaning that under heavy load and high current conditions, the on-resistance Rdson of the MOS in the Efuse is uncontrollable. Rdson is solely determined by manufacturing processes and material properties, making it impossible to guarantee that the current flowing through each Efuse or MOS is the same. In practical high-current scenarios, the current changes unpredictably and irregularly over time, and the current rise slope is also unpredictable. A schematic diagram of the working current waveform is shown in FIG. 1: a horizontal axis represents time T in milliseconds (ms), and a vertical axis represents current I in amperes (A). It can be observed that the current changes irregularly and unpredictably.

According to a power $P=\Delta U*I$, $\Delta U-Uvin-Uvout$, where Uvin represents an input voltage and Uvout represents an output voltage. In an ideal situation, the input terminal voltage and output terminal voltage of multi-phase parallel Efuse are the same, so the magnitude of the current flow on each Efuse is different because of the difference of Rdson. More heat will be generated on the Efuse with larger flow than other Efuses. If this heat is accumulated beyond the working limit of Efuse, overcurrent and overheating will destroy the working stability of Efuse. Once the Efuse stops working, other parallel Efuses will take on its load current, which will lead to further deterioration of the working situation and even lead to the failure of the surrounding devices together, which will bring the risk of burning the board.

Figure 2:
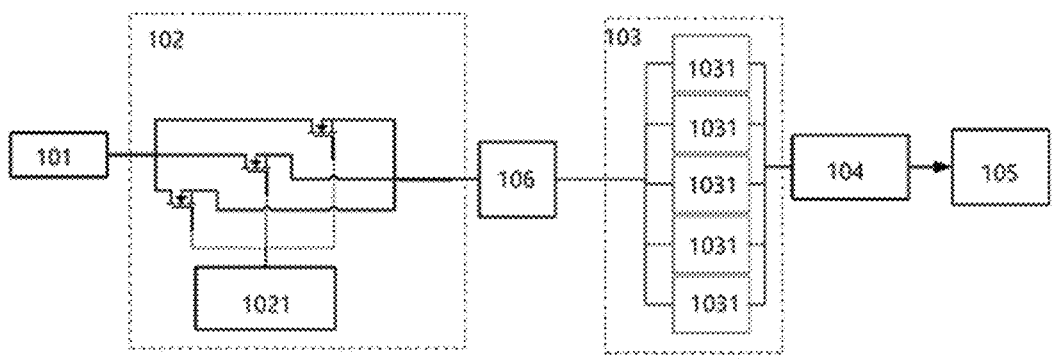
FIG. 2 is a schematic diagram of a current conventional chip power supply structure.

Taking a power supply structure for the current conventional chip as an example, referring to the circuit structure shown in FIG. 2, a 54V power supply input terminal 101 inputs 54V voltage, and a 54V bus is protected by a 54V separated Efuse unit 102. In FIG. 2, three 54V_MOS transistors and a 54V electronic fuse control unit 1021 are exemplarily shown to represent the 54V separated Efuse unit 102.

The 54V separated Efuse unit 102 outputs 54V voltage, which is changed into 12V voltage through a 4:1 voltage conversion module 106, and the 12V voltage protects the 54V bus through a 12V integrated Efuse unit 103. Five low-voltage Efuse structures 1031 are exemplarily shown in FIG. 2 to represent the 12V integrated Efuse unit 103. After the voltage of 12V is regulated by VR (voltage regulation) unit 104, the working voltage required by a CPU chip 105, for example, 1.3V, is generated and then output to the CPU chip 105.

In the above circuit structure, both the 54V separated Efuse unit 102 and the 12V integrated Efuse unit 103 are designed to realize passive current sharing of multi-phase Efuse only by means of wiring layout, and it is impossible to predict the working current state of each Efuse in practical application.

When one Efuse has parameter discrepancies, such as the top Efuse in the 12V integrated Efuse unit 103 differing from the others, its Rdson (on-resistance) may be smaller when it is turned on, causing the current flowing through it to increase. Under high current conditions, its Rdson will then rise due to increased temperature, leading to a reduction in the current it carries, thereby achieving passive current sharing. However, if the temperature of the top Efuse exceeds its operational limit, it will cease to function. The remaining four parallel Efuses will then need to shoulder its load current, exacerbating the overall operational conditions. This could potentially trigger the failure of surrounding components, such as capacitors failing or even catching fire, ultimately posing a risk of burning out the entire board.

In order to solve the above problems, how to actively force the output currents of the circuits to be the same when the currents flowing in each circuit path are different, to achieve balance, the embodiments of the present disclosure propose a forced current sharing circuit, and the forced current sharing circuit of the present disclosure will be described in detail below.

The forced current sharing circuit proposed by the present disclosure includes a multi-phase coupled device and a plurality of parallel current channels; The first terminal of each phase in the multi-phase coupled device is connected to the output terminal of a current channel; The second terminal of each phase in the multi-phase coupled device is connected to the second terminals of other phases in parallel and then connected to the load; Wherein, the coupling coefficient and mutual inductance between each two phases in the multi-phase coupled device are 1, so that the first and second terminal currents of each phase in the multi-phase coupled device are equal to those of other phases.

Figure 3:
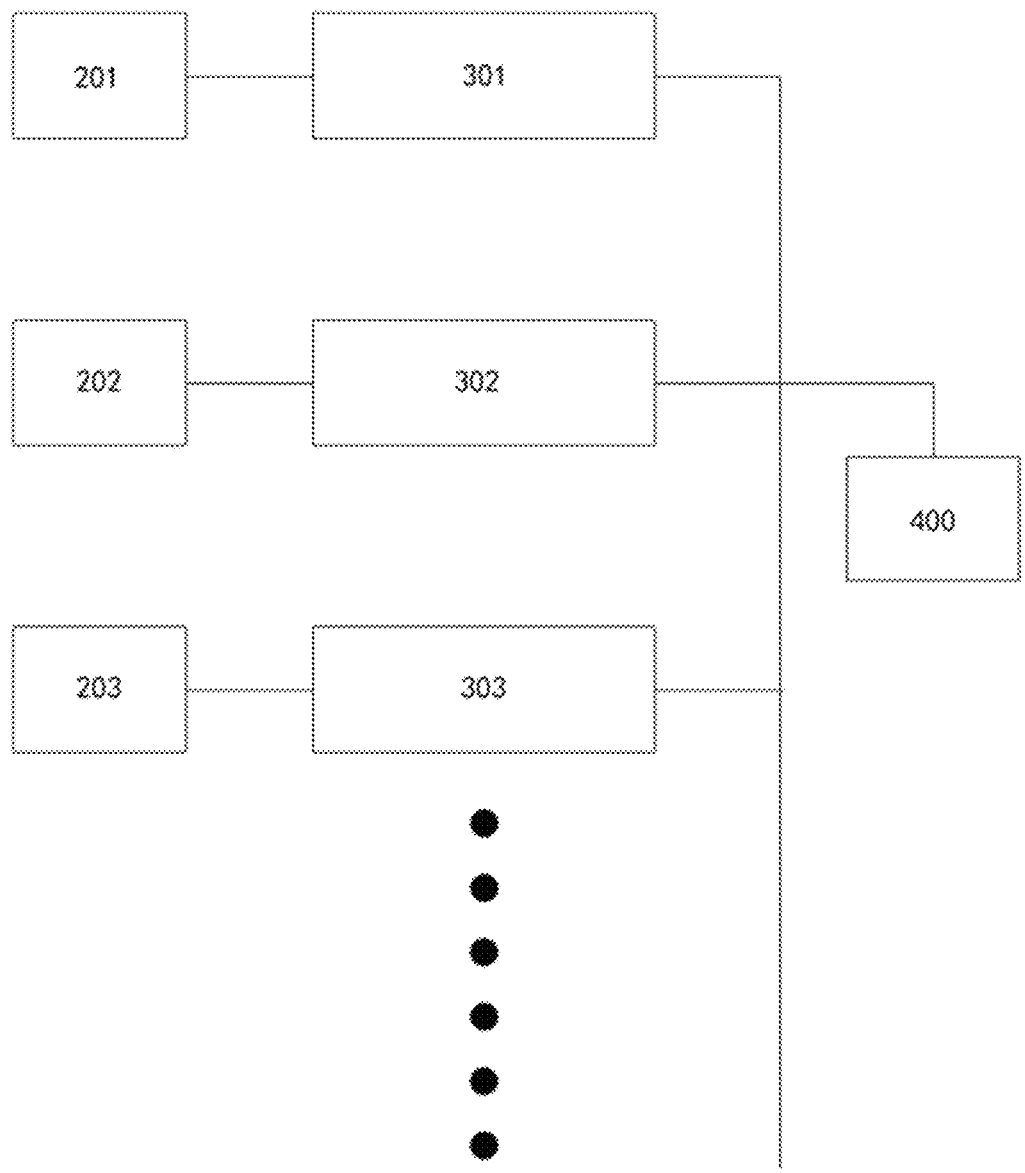
FIG. 3 is a modular schematic diagram of a forced current sharing circuit in an embodiment of the present disclosure.

The above structure can be better understood by the modular schematic diagram of the forced current sharing circuit shown in FIG. 3. FIG. 3 includes a plurality of parallel current channels 201, 202, 203, . . . . The first terminal of each phase 301, 302, 303, . . . , in the multi-phase coupled device 300 is connected to the output terminal of a current channel, for example, as shown in FIG. 3, the first phase 301 is connected to the first current channel 201, and the second phase 302 is connected to the second current channel 202.

The second terminals of all phases are connected in parallel and then connected to the load 400. For example, as shown in FIG. 3, the second terminals of the first phase 301, the second phase 302 and the third phase 303 are connected in parallel and then connected to the load 400.

In a multiphase coupled device, the coupling coefficient and mutual inductance between every two phases are both 1, indicating perfect coupling with no leakage flux. As a result, when the current flowing through any one phase changes, for example, due to differences in the Rdson of the Efuse, causing the current transmitted through the second current channel 202 to change and the current flowing through the second phase 302 to change, the currents in all other phases 301, 303, . . . will simultaneously change as well. This ensures that the currents at the first and second terminals of each phase 301, 303, . . . in the multi-phase coupled device are equal to those at the corresponding terminals of the other phases, thereby achieving active forced current sharing.

Moreover, the forced current sharing circuit proposed in the present disclosure does not add control logic or control circuit, but only adds multi-phase coupled devices on the basis of the existing circuit structure, so the overall circuit structure is simple, and it is not easy to make mistakes because of the characteristics of passive components, which improves the efficiency of the power cycle of the forced current sharing circuit and improves the reliability of the forced current sharing circuit.

In some embodiments of the present disclosure, the multi-phase coupled device may include a multi-phase coupled transformer or a multi-phase coupled inductor.

For the multi-phase coupled transformer, the winding coils of all phases share a magnetic core; Moreover, the winding coils of every two phases in the multi-phase coupled transformer is coupled at different terminals, and the coupling coefficient and mutual inductance between the winding coils of every two phases are 1. The first terminal of winding coil of each phase in the multi-phase coupled transformer is connected to the output terminal of a current channel.

In the multi-phase coupled transformer, the second terminal of the winding coil of each phase is connected to the load after being connected in parallel with the second terminals of winding coils of other phases, and the first terminal of the n−1th phase winding coil and the second terminal of the n-th phase winding coil are of the same polarity, where n is more than or equal to 2.

Similarly, for multi-phase coupled inductors, the inductance coils of all phases in the structure share a magnetic core; Moreover, in the multi-phase coupled inductor, the inductance coil of every two phases is coupled at different terminals, and the coupling coefficient and mutual inductance between the inductance coil of every two phases are 1. The first terminal of the inductance coil of each phase in the multi-phase coupled inductor is connected to the output terminal of a current channel.

In the multi-phase coupled inductor, the second terminal of inductance coil of each phase is connected to the load after being connected in parallel with the second terminals of inductance coil of other phases, and the first terminal of the n−1th phase inductance coil and the second terminal of the nth phase inductance coil are of the same polarity, where n is more than or equal to 2.

Figure 4:
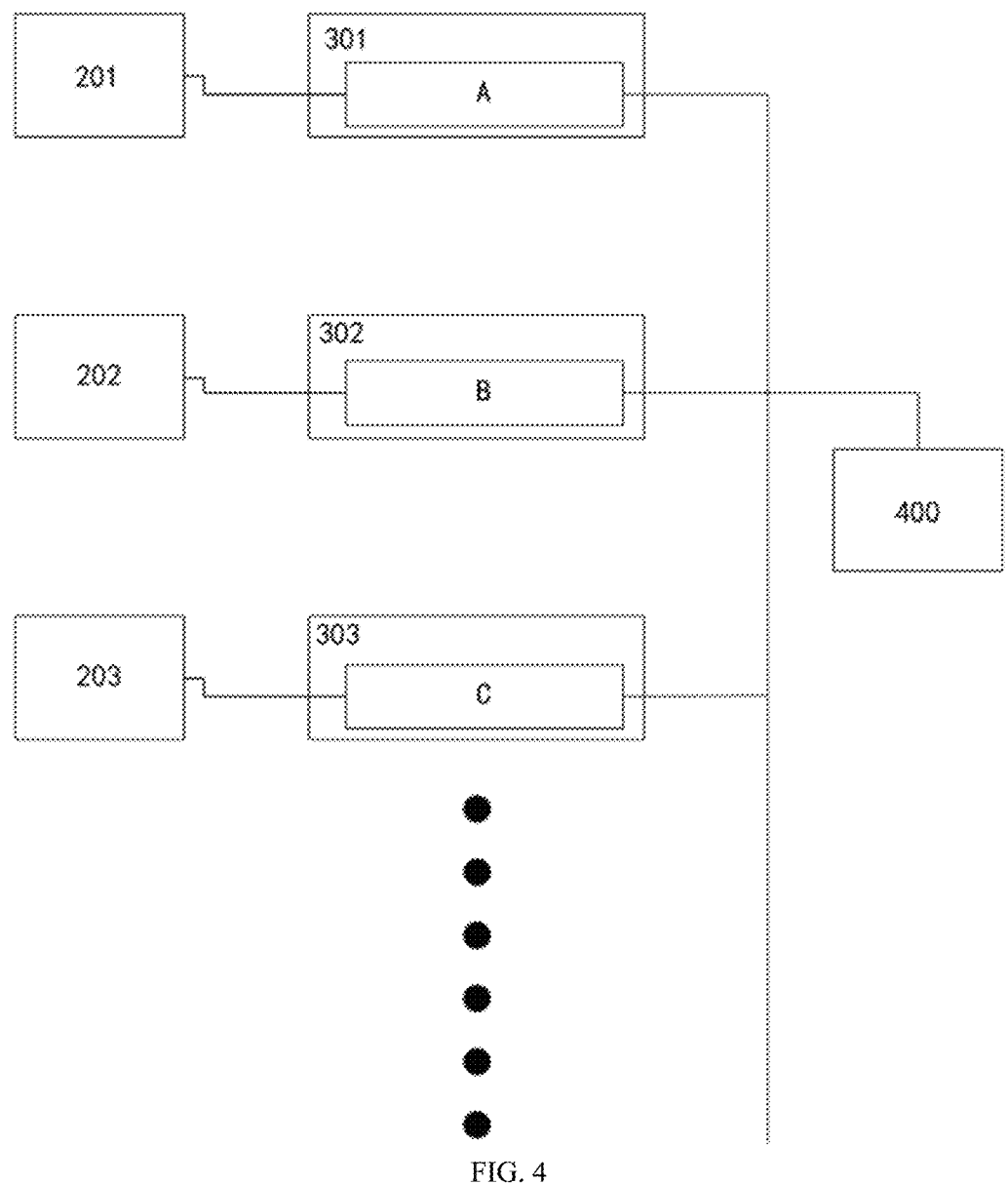
FIG. 4 is a modular schematic diagram of a forced current sharing circuit taking a multi-phase coupled transformer as an example in an embodiment of the present disclosure.

The above structure can be better understood by the modular schematic diagram of forced current sharing circuit taking a multi-phase coupled transformer as an example shown in FIG. 4. In FIG. 4, three phases are taken as an example, and the structures of other parts are the same as those in FIG. 3. The first terminal of winding coil A of the first phase 301 is connected to the output of the first current channel 201, the first terminal of winding coil B of the second phase 302 is connected to the output of the second current channel 202, and the first terminal of winding coil C of the third phase 303 is connected to the output of the second current channel 203.

The second terminal of the winding coil A, the second terminal of the winding coil B and the second terminal of the winding coil C are connected in parallel and then connected to the load 400. The first terminal of winding coil A and the second terminal of winding coil B are of the same polarity, and the first terminal of winding coil B and the second terminal of winding coil C are of the same polarity.

Because the coupling coefficient and mutual inductance of the winding coils of every two phases in the multi-phase coupled transformer are all 1, or the coupling coefficient and mutual inductance of the winding coils of every two phases in the multi-phase coupled inductor are all 1, according to a mutual inductance calculation formula, it can be known that the self-inductance of the winding coil of each phase in the multi-phase coupled transformer is the same; Or the self-inductance of the inductance coil of each phase in the multi-phase coupled inductor is the same.

Take two-phase winding coil or two-phase inductance coil as an example, and the calculation formula of mutual inductance is:

$$M = \frac{K}{\sqrt{L1 * L2}}$$

In the above formula, M represents a mutual inductance, K represents a coupling coefficient, L1 represents a self-inductance of a one-phase winding coil or inductance coil, and L2 represents a self-inductance of another phase winding coil or inductance coil. In the same way, it can be concluded that the self-inductance of each n-phase winding coil or inductance coil is consistent.

When the forced current sharing circuit is in a dynamic working state, when the current of any connected current channel changes, the other phases all induce electromotive force, so that the current output to the load changes at the same time, and then the current at the first terminal and the second terminal of each phase is equal.

However, when the forced current sharing circuit is in a static state, the loop impedance of the current channel connected to each phase in the multi-phase coupled device is increased due to the existence of the coil direct-current resistance (DCR), and the increase of the loop impedance can passively adjust and reduce the uneven current ratio of multiple current channels. Moreover, the increase of the loop impedance is also beneficial to prevent the current channel from reaching a power limit, that is, to prevent it from reaching the commonly known power limit. It should be noted that a so-called dynamic working state refers to the state that the load of the current-sharing circuit is forced to change continuously, resulting in the continuous change of its working current, and the so-called static working state refers to the state that the load of the current-sharing circuit is forced to remain unchanged and the working current is not changed.

In some embodiments of the present disclosure, the forced current sharing circuit further includes a plurality of electronic fuses, that is, a plurality of Efuses, wherein one electronic fuse is arranged in one current channel, and how many electronic fuses are arranged according to how many current channels there are.

Based on this circuit structure, the first terminal of each phase in the multi-phase coupled device can be directly connected to the output terminal of an electronic fuse Efuse, and the input terminal of each electronic fuse Efuse receives the current output by the preceding circuit; The second terminal of each phase in the multi-phase coupled device is connected to the load after being connected in parallel with the second terminals of other phases. Taking the current conventional chip power supply structure as an example, the input terminal of each electronic fuse Efuse receives the current transmitted on the 12V voltage destination line, and its output terminal is connected to one phase of the multi-phase coupled devices.

In some embodiments of the present disclosure, considering the reverse voltage impact when the board is powered off, it may damage the back-stage structure or components of the multi-phase coupling device after the second terminals of all phases are connected in parallel, and the forced current sharing circuit further includes a current detection unit, a current source, a discharge resistor and a plurality of discharge units.

The current detection unit is connected to the current source and used to detect the current output to the load, that is, detect the current output after the second terminals of all phases in the multi-phase coupled device are connected in parallel; The current detection unit is also used to send a control signal to the current source according to the detected current output to the load.

The current source is respectively connected to a plurality of discharge units and discharge resistors, and is used to inject currents of different magnitudes into the discharge resistors according to the control signals; Each discharge unit is connected in parallel to one phase of the multi-phase coupled device, and each discharge unit is used to discharge or retain the energy stored in its own parallel phase according to the current of different magnitudes injected into the discharge resistor.

Take the multi-phase coupled device as a multi-phase coupled transformer as an example: each discharge unit is connected in parallel with a winding coil of the multi-phase coupled transformer, each discharge unit is connected in parallel with one phase of the winding coil in the multi-phase coupled transformer. Each discharge unit is used to discharge or retain the energy stored in the winding coil connected in parallel with it, depending on the magnitude of the current injected into the discharge resistor. Similarly, the connection relationship for inductor coils can be deduced in the same manner, and thus will not be elaborated further.

In the concrete structure, the negative terminal of the current source is grounded, and the positive terminal is respectively connected to the second terminals of a plurality of discharge units and the first terminal of the discharge resistor; The second terminal of the discharge resistor is grounded. The respective first terminals of a plurality of discharge units are connected to the input terminals of respective connected phase. Take the multi-phase coupled device as a multi-phase coupled transformer as an example: the first terminal of each discharge unit is connected to the input terminal of the winding coil it is connected to, that is, the terminal connected to the current channel.

In some embodiments of the present disclosure, the current detection unit can detect the current output to the load in various ways known at present, and a better way is to detect the current output to the load by using a precision resistor, so the forced current sharing circuit further includes a precision resistor. The specific structure is as following.

The second terminals of all phases in the multi-phase coupled device are connected in parallel and then connected to the first terminal of the precision resistor, and the second terminal of the precision resistor is connected to the input terminal of the load; That is, the precision resistor is located in the output current channel after the second terminals of all phases are connected in parallel, which is beneficial for the current detection unit to accurately detect the current output to the load by using the precision resistor.

The current detection unit accurately detects the current output to the load by using the precision resistor, and then generates a corresponding control signal according to whether the current is normal (that is, the power supply of the board is normal) or abnormal (that is, the power supply of the board is abnormal or power failure), and sends the signal to the current source.

In some embodiments of the present disclosure, the discharge unit can use various circuit structures or components known at present to maintain or discharge the energy stored in the phase connected in parallel with it, and a better way is to use diodes, so the discharge unit includes: diodes; the specific structure is as following.

An anode of the diode is connected to the input terminal of a parallel connecting phase; A cathode of the diode is respectively connected to the positive terminal of the current source and the first terminal of the discharge resistor.

In some embodiments of the present disclosure, the current source can adopt various current source structures known at present to realize injecting a preset current into the discharge resistor or reducing the injected current. A better way is to adopt a voltage-controlled current source (abbreviated as VCCS), so the current sources include: voltage-controlled current source. Generally, a simple voltage-controlled current source can be composed of a resistor and a triode. The base of the triode receives the control signal, the collector is grounded, and the emitter is connected to the discharge resistor.

Figure 5:
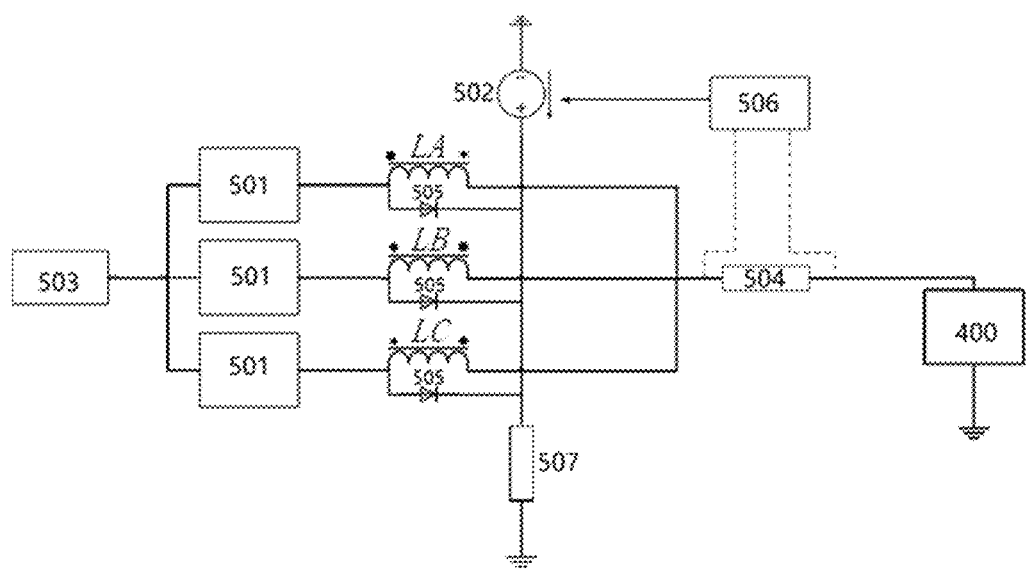
FIG. 5 is a structural diagram of a forced current sharing circuit in an embodiment of the present disclosure.

In order to better explain and illustrate the above-mentioned forced current sharing circuit, refer to a structural diagram of a forced current sharing circuit shown in FIG. 5. In FIG. 5, the multi-phase coupled device adopts a three-phase coupled transformer (three-phase transformer coils LA, LB, LC), three Efuse units 501 are arranged on the three current channels, the current source employs a voltage-controlled current source 502, and the discharge units use diodes 505 as an example.

The voltage bus 503 realizes current protection by three Efuse units 501, and the respective output terminals of each Efuse unit 501 are respectively connected to the respective first terminals of three-phase transformer coils LA, LB and LC and the respective first terminals of three diodes D. The first terminal of the three-phase transformer coil LA is exemplified by a black solid circle, and the second terminal is exemplified by a black solid pentagon. The first terminal of LB is exemplarily represented by a black solid diamond, and the second terminal is exemplarily represented by a black solid circle; The first terminal of LC is exemplified by a black pentagon, and the second terminal is exemplified by a black solid diamond. Therefore, it can be seen that the winding coils of every two phases are coupled with opposite polarity, and the coupling coefficient and mutual inductance of the winding coils of every two phases are 1, and the self-inductance is also consistent.

The second terminals of the coils LA, LB and LC of the three-phase transformer are connected in parallel and then connected to the first terminal of the precision resistor 504, and the second terminal of the precision resistor 504 is connected to the load 400.

The second terminals of the three diodes 505 are respectively connected to the positive terminal of the voltage-controlled current source 502 and the first terminal of the discharge resistor 507, the negative terminal of the voltage-controlled current source 502 is grounded, and the second terminal of the discharge resistor 507 is grounded.

The current detection unit 506 uses the precision resistor 504 to detect the current output to the load 400, and sends a control signal to the voltage-controlled current source 502 according to the detected current output to the load 400.

When the forced current sharing circuit is in a dynamical work state and normally charged (which means that the power supply is normally powered), the current output to the load 400 detected by the current detection unit 506 is normal, and the current detection unit 506 sends a first control signal to the voltage-controlled current source 502; The voltage-controlled current source 502 receives the first control signal and injects a current of a preset magnitude into the discharge resistor 507, so that each diode 505 retains the energy stored in the transformer coil in parallel with itself. The voltage-controlled current source 502 injects a current of a preset magnitude into a plurality of discharge resistors 507, so that the voltage at the first terminals of the discharge resistors 507 is equal to the voltage at the first terminals of all phase transformer coils in the multi-phase coupled transformer, so that each discharge unit can retain the energy in parallel with itself.

For example, if the bus voltage is 12V, then the voltage-controlled current source 502 injects a current of a preset magnitude into the discharge resistor 507, so that the voltage at the first terminal of the discharge resistor 507 can also be maintained at around 12V (floating within the allowable error range), which is equal to the voltage at the first terminal of each transformer coil, so that each diode 505 can retain the energy stored in the transformer coil in parallel with itself.

At the same time, when the current flowing through a certain Efuse changes, due to the coupling coefficient and mutual inductance between every two-phase transformer coils in the multi-phase coupled transformer both being 1, an electromotive force is induced in the remaining phase transformer coils. This causes the current output to the load to change simultaneously, thereby ensuring that the currents at the first and second terminals of each transformer coil are equal.

The current detection unit 506 sends a second control signal to the voltage-controlled current source 502 when the forced current sharing circuit is in an abnormal power-off state (that is, the power supply is abnormal or there is no power supply) and the current output to the load 400 detected by the current detection unit 506 is abnormal. The voltage-controlled current source 502 receives the second control signal, and reduces the magnitude of the current injected into the discharge resistor 507, so that each diode 505 discharges the energy stored in its own parallel phase transformer coil. If the voltage-controlled current source 502 reduces the magnitude of current injected into the discharge resistor 507, the voltage at the first terminal of the discharge resistor 507 will be smaller than the voltage at the first terminals of all phase transformer coils in the multi-phase coupled transformer, so that each diode 505 can discharge the energy stored in its own parallel phase transformer coil.

For example, if the bus voltage is 12V, when an abnormal disconnection occurs, the voltage-controlled current source 502 reduces the magnitude of the current injected into the discharge resistor 507, causing the voltage at the first terminal of the discharge resistor 507 to drop below 12V, which is lower than the voltage at the first terminal of each transformer coil. Due to the presence of capacitors in the circuit, the bus voltage decreases slowly, and the anode voltage of each diode 505 will be higher than its cathode voltage, causing each diode 505 to conduct. This allows each diode 505 to release the energy stored in the transformer coil connected in parallel with it, thereby preventing damage to the post-stage circuit structure or components caused by the reverse electromotive force generated by E (back electromotive force)=−L (inductance value) di/dt.

As for the current-sharing effect when the forced current sharing circuit is in the static working state, it is tested by the current conventional chip power supply structure, and it is found that the on-resistance Rdson in Efuse is almost the same in the static working state, most of which is 1 milliohm, so it is naturally unnecessary to actively share the current.

Additionally, due to the presence of the DC resistance (DCR) of transformer coil in each phase of the multi-phase coupled transformer, the loop impedance of the connected current channel is increased, and the increase of loop impedance can passively adjust and reduce the uneven current ratio of multiple current channels. Moreover, the increase of loop impedance is also beneficial to prevent the current channel from reaching the power limit, that is, to prevent it from reaching the commonly known power limit.

For example, taking a three-phase coupled transformer with a self-inductance of 400 μH, a coil DC resistance (DCR) of 0.25 mΩ, and a single-phase current flow of 50 A for calculation: after the introduction of the coupled transformer coil (which can be regarded as an inductor), the line voltage drop increases by only 12.5 mV, which is negligible for a 12 V or 13.5 V bus.

Figure 6:
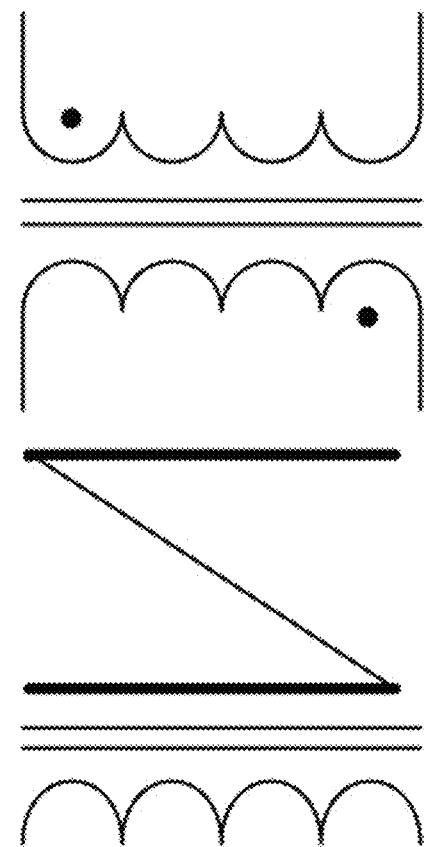
FIG. 6 is a schematic structural diagram of an exemplary three-phase coupled transformer in an embodiment of the present disclosure.

At the same time, taking the two-phase parallel Efuse as an example for calculation, assuming that one-phase on-resistance Rdson is 1 milliohm and the other-phase on-resistance Rdson is 0.5 ohm, adding a three-phase coupled transformer can increase the loop impedance with smaller on-resistance Rdson to prevent touching the power limit limit, and the current ratio of the two-phase circuit is also adjusted from 1:2 to 3:5. The inclusion of the three-phase coupled transformer simultaneously reduces the current imbalance percentage in the purely static working circuit For example, the structural diagram of an exemplary three-phase coupled transformer shown in FIG. 6, in which three-phase coils share a magnetic core; Each two-phase winding coil is coupled with opposite polarity, and the coupling coefficient and mutual inductance between the winding coils of every two phases are 1.

In some embodiments of the present disclosure, if the multi-phase coupled device adopts the multi-phase coupled inductor, a small inductor with the inductor model of CTX17-18765-R can be preferred to form the multi-phase coupled inductor. The current detection unit can be preferably a digital current monitoring chip, such as a chip of model INA226, with high sampling rate and fast response speed, which supports I2C communication or SPI communication protocol. The electronic fuse Efuse can preferably be of 50 A current specification, and the on-resistance Rdson is 1 milliohm, and the model is MP5991. The voltage-controlled current source is preferably a combination of resistor and triode, and the model of the voltage-controlled current source is LMBT3904DWITIG. Certainly, the above are only preferred components and their models, and all other circuit structures or components that can achieve the above functions can be used as replacements.

Figure 7:
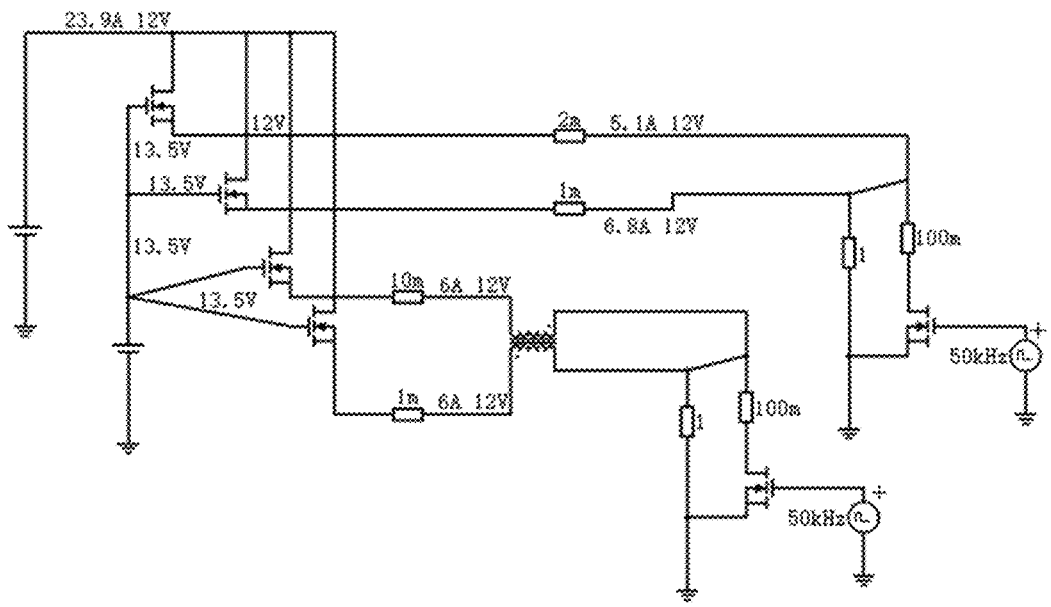
FIG. 7 is a schematic diagram of simulation test of a forced current sharing circuit under dynamic load in an embodiment of the present disclosure.

In order to verify the effectiveness of the forced current sharing circuit proposed in the present disclosure, a simulation test is carried out based on a forced current sharing circuit under a dynamic load shown in FIG. 7. In the simulation, a certain frequency is selected, and another heavy load is connected into the existing load in parallel, wherein the existing load is 1 milliohm, and the added heavy load is 100 milliohms, and the resistances representing the on-resistance Rdson of the electronic fuse Efuse are set to 2 milliohms, 1 milliohm, 10 milliohms and 1 milliohm respectively. The bus voltage is 12V, the bus current is 23.9 A (A), and the gate voltage of MOS tube is controlled to 13.5V.

As can be seen from FIG. 7, the simulation results show that the input currents without a coupled transformer are 5.1 A and 6.8 A respectively. With the two-phase coupled transformer coils below, their respective input currents are: 6A, 6A.

Through simulation test and simulated oscilloscope, it can be concluded that the current waveforms flowing through the back-end lines of the coupled transformer are almost identical (the current scales are consistent) at the same time under dynamic load. Refer to the current waveform curve shown in FIG. 8, which shows the current waveform curve flowing through the front-end lines with two-phase coupled transformer coils (the input currents are 6 A and 6 A respectively).

Figure 8:
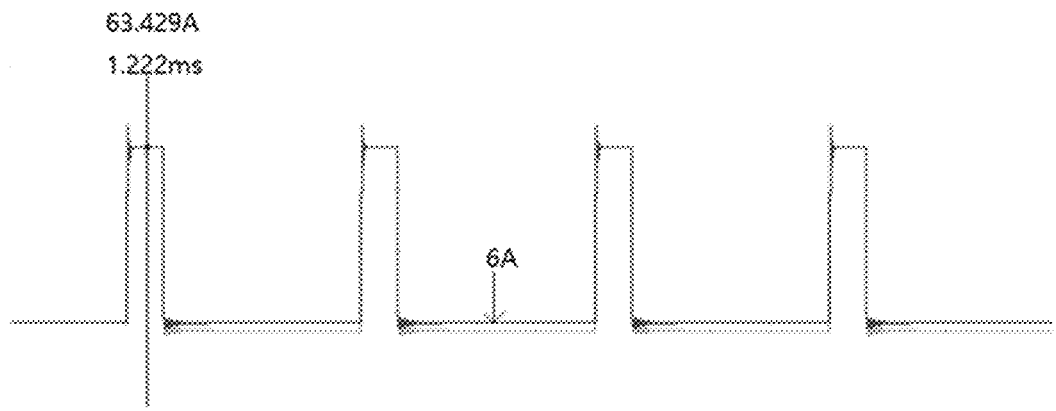
FIG. 8 is a waveform diagram of a current flowing through a front-end circuit of a two-phase coupled transformer at the same moment in a circuit structure corresponding to FIG. 7 in an embodiment of the present disclosure.

As can be seen from the simulated oscilloscope, at the time of 1.222 ms in FIG. 8, the current value is 6 A, and the currents of the two lines are almost the same at the same time. However, the two-phase currents of the transformer coil without two-phase coupled transformer coils are 5.1 A and 6.8 A respectively, and there is no current sharing. Therefore, it can be verified that the forced current sharing effect of the present disclosure is remarkable.

Moreover, based on the above explanation and description of the forced current sharing circuit and its circuit structure and principle, those skilled in the art can easily know that the forced current sharing circuit proposed in the present disclosure is not only suitable for the field of integrated circuits, but also can be extended to other application scenarios with similar active forced current sharing requirements in low voltage, high voltage, power grid or commercial power supply, such as distributed renewable energy grid which is widely promoted at present. At the current output terminal of each line, the above-mentioned multi-phase coupled device, current detection unit, current source, discharge resistor and multiple discharge units can be added to realize active forced current sharing so as to continuously optimize the power supply structure.

Based on the above-mentioned forced current sharing circuit, the embodiment of the present disclosure also proposes a chip, and the power supply structure of the chip adopts any forced current sharing circuit as above.

Based on the forced current sharing circuit, the embodiment of the present disclosure also provides a motherboard, which includes any forced current sharing circuit as above;

The forced current sharing circuit is used to force the output current of the power supply terminal in the motherboard to meet the power supply current requirements of the chips in the motherboard.

Figure 9:
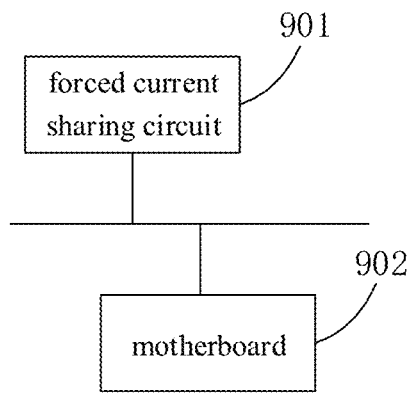
FIG. 9 is a block diagram of an electronic device provided in an embodiment of the present disclosure.

Based on the above-mentioned forced current sharing circuit, the embodiment of the present disclosure also proposes an electronic device. As shown in FIG. 9, the electronic device includes any forced current sharing circuit 901 as above;

The forced current sharing circuit 901 is used to force the output current of the power supply terminal of the motherboard 902 in electronic device to meet the power supply current requirements of the chips in the motherboard 902.

Through the above examples, the forced current sharing circuit provided by the present disclosure includes a multi-phase coupled device and a plurality of parallel current channels; The first terminal of each phase in the multi-phase coupled device is connected to the output terminal of a current channel; The second terminal of each phase in the multi-phase coupled device is connected to the load after being connected in parallel with the second terminals of other phases.

Because the coupling coefficient and mutual inductance between every two phases in the multi-phase coupled device are both 1, indicating perfect coupling with no leakage flux. Consequently, when the current flowing through any one phase changes, the currents in all other phases will change simultaneously, ensuring that the currents at the first and second terminals of each phase in the multi-phase coupled device are equal to those at the corresponding terminals of the other phases.

The forced current-sharing circuit proposed in the present disclosure can actively enforce current sharing, thereby avoiding the issue where individual Efuses may exceed their operational limits due to manufacturing processes or product batch variations, leading to overcurrent, overheating, and eventual cessation of operation. With this circuit, the current flowing through all Efuses does not exceed the limit, naturally preventing overheating issues and the potential failure of surrounding components. This avoids accidents such as thermal damage and enhances the stability of the board's operation.

Moreover, the forced current sharing circuit proposed in the present disclosure does not require additional control logic or control circuits, resulting in a simple circuit structure. Since it solely relies on the characteristics of passive components, it is less prone to errors. This not only improves the power cycling and efficiency of the forced current sharing circuit but also enhances the reliability of the forced current sharing circuit.

Although the preferred embodiments of the embodiments of the present disclosure have been described, those skilled in the art can make additional changes and modifications to these embodiments once they know the basic inventive concepts. Therefore, the appended claims are intended to be interpreted as including the preferred embodiment and all changes and modifications that fall within the scope of the embodiments of the present disclosure.

Finally, it should be noted that in this paper, relational terms such as first and second are only used to distinguish one entity or operation from another entity or operation, and do not necessarily require or imply any such actual relationship or order between these entities or operations. Moreover, the terms "including", "containing" or any other variation thereof are intended to cover non-exclusive inclusion, so that a process, method, article or terminal device including a series of elements includes not only those elements, but also other elements not explicitly listed, or elements inherent to such process, method, article or terminal device. Without more restrictions, the element defined by the sentence "including one." does not exclude that there are other identical elements in the process, method, article or terminal device including the element.

The embodiments of the present disclosure have been described above with reference to the attached drawings, but the present disclosure is not limited to the above specific embodiments, which are only schematic, not restrictive. Under the inspiration of the present disclosure, persons skilled in the art can make many forms without departing from the purpose of the present disclosure and the scope protected by the claims, which are all within the protection of the present disclosure.

The invention claimed is:

1. A forced current sharing circuit, comprising: a multi-phase coupled device and a plurality of parallel current channels; wherein the multi-phase coupled device comprises a multi-phase coupled transformer or a multi-phase coupled inductor; winding coils of all phases in the multi-phase coupled transformer share a single magnetic core; inductance coils of all phases in the multi-phase coupled inductor share a single magnetic core;
   a first terminal of a winding coil of each phase in the multi-phase coupled transformer is connected to an output terminal of a current channel;
   a second terminal of the winding coil of each phase in the multi-phase coupled transformer is connected to the load after being connected in parallel with second terminals of winding coils of other phases, and a first terminal of a winding coil of a (n−1)th phase and a second terminal of a winding coil of a nth phase are of the same polarity, where n is more than or equal to 2; or,
   a first terminal of an inductance coil of each phase in the multi-phase coupled inductor is connected to an output terminal of a current channel; and
   a second terminal of the inductance coil of each phase in the multi-phase coupled inductor is connected to the load after being connected in parallel with the second terminals of inductance coils of other phases, and a first terminal of an inductance coil of a (n−1)th phase and a second terminal of the inductance coil of a nth phase are of the same polarity, where n is more than or equal to 2; and
   a coupling coefficient and a mutual inductance between each two phases in the multi-phase coupled device are 1, so that currents at the first terminal and the second terminal of each phase in the multi-phase coupled device are equal to currents at first terminals and the second terminals of other phases;
   wherein the forced current sharing circuit further comprises a plurality of electronic fuses, one of which is arranged in a current channel;
   the first terminal of each phase in the multi-phase coupled device is connected to an output terminal of an electronic fuse, and an input terminal of each electronic fuse receives a current output by a preceding circuit; and
   the second terminal of each phase in the multi-phase coupled device is connected to the load after being connected in parallel with the second terminals of other phases.

2. The forced current sharing circuit according to claim 1, wherein the coupling coefficient and the mutual inductance of the winding coils of every two phases in the multi-phase coupled transformer are both 1, so that a self-inductance of the winding coil of each phase is the same; or,
   the coupling coefficient and the mutual inductance of the inductance coil of every two phase in the multi-phase coupled inductor are both 1, so that a self-inductance of the inductance coil of each phase is the same.

3. The forced current sharing circuit according to claim 1, wherein when the forced current sharing circuit is in a dynamic working state, and when the current of any current channel connected by any phase changes, the other phases all induce a electromotive force, so that the current output to the load changes at the same time, thereby making the current of the first terminal and the second terminal of each phase are equal.

4. The forced current sharing circuit according to claim 3, wherein the dynamic working state refers to a state that the load of the current-sharing circuit is forced to change continuously, resulting in the continuous change of its working current.

5. The forced current sharing circuit according to claim 1, wherein when the forced current sharing circuit is in a static working state, each phase in the multi-phase coupled device increases a loop impedance of the current channel connected to each phase, and passively adjusts and reduces an uneven current ratio of a plurality of current channels.

6. The forced current sharing circuit according to claim 1, wherein when the forced current sharing circuit is in a static working state, each phase in the multi-phase coupled device increases a loop impedance of the current channel connected to each phase to prevent a power limit from being reached.

7. A motherboard, wherein the motherboard comprises the forced current sharing circuit according to claim 1;
the forced current sharing circuit is configured to force current sharing the output current of a power supply terminal in the motherboard to meet requirements of the power supply current of chips in the motherboard.

8. An electronic device, wherein the electronic device comprises the forced current sharing circuit according to claim 1;
the forced current sharing circuit is configured to force current sharing the output current of a power supply terminal in a motherboard in the electronic device to meet requirements of the power supply current of chips in the motherboard.

9. A forced current sharing circuit, comprising: a multi-phase coupled device and a plurality of parallel current channels; wherein the multi-phase coupled device comprises a multi-phase coupled transformer or a multi-phase coupled inductor; winding coils of all phases in the multi-phase coupled transformer share a single magnetic core; inductance coils of all phases in the multi-phase coupled inductor share a single magnetic core;
a first terminal of a winding coil of each phase in the multi-phase coupled transformer is connected to an output terminal of a current channel;
a second terminal of the winding coil of each phase in the multi-phase coupled transformer is connected to the load after being connected in parallel with second terminals of winding coils of other phases, and a first terminal of a winding coil of a (n−1)th phase and a second terminal of a winding coil of a nth phase are of the same polarity, where n is more than or equal to 2; or,
a first terminal of an inductance coil of each phase in the multi-phase coupled inductor is connected to an output terminal of a current channel; and
a second terminal of the inductance coil of each phase in the multi-phase coupled inductor is connected to the load after being connected in parallel with the second terminals of inductance coils of other phases, and a first terminal of an inductance coil of a (n−1)th phase and a second terminal of the inductance coil of a nth phase are of the same polarity, where n is more than or equal to 2; and
a coupling coefficient and a mutual inductance between each two phases in the multi-phase coupled device are 1, so that currents at the first terminal and the second terminal of each phase in the multi-phase coupled device are equal to currents at first terminals and the second terminals of other phases;
wherein the forced current sharing circuit further comprises a current detection unit, a current source, a discharge resistor and a plurality of discharge units;
the current detection unit is connected to the current source and configured to detect a current output to the load and send a control signal to the current source according to the detected current output to the load;
the current source is respectively connected to a plurality of discharge units and the discharge resistors, and is configured to inject currents of different magnitudes into the discharge resistor according to the control signal; and
one of the discharge units is connected in parallel with one phase of the multi-phase coupled device, and is configured to discharge or maintain energy stored in a phase parallel with the discharge unit according to the magnitude of the current injected into the discharge resistor.

10. The forced current sharing circuit according to claim 9, wherein a negative terminal of the current source is grounded, and a positive terminal of the current source is respectively connected to a second terminal of each of the plurality of discharge units and a first terminal of the discharge resistor;
a first terminal of each of the plurality of discharge units is connected to an input terminal of a respective connected phase; and
a second terminal of the discharge resistor is grounded.

11. The forced current sharing circuit according to claim 9, wherein when the forced current sharing circuit is in a normally charged state, the current output to the load detected by the current detection unit is normal, and the current detection unit sends a first control signal to the current source;
the current source receives the first control signal, and injects a current of a preset magnitude into the discharge resistor, so that each discharge unit keeps the energy stored in the phase parallel with the discharge unit.

12. The forced current sharing circuit according to claim 11, wherein the current source injects the current of the preset magnitude into a plurality of the discharge resistors, so that a magnitude of a voltage at the first terminal of the discharge resistor is equal to a voltage at first terminals of all phases in the multi-phase coupled device, and each discharge unit keeps the energy stored in the phase parallel with the discharge unit.

13. The forced current sharing circuit according to claim 9, wherein when the forced current sharing circuit is in an abnormal power-off state, the current output to the load detected by the current detection unit is abnormal, and the current detection unit sends a second control signal to the current source;
the current source receives the second control signal and reduces the magnitude of the current injected into the discharge resistor, so that each discharge unit discharges the energy stored in the phase parallel with the discharge resistor.

14. The forced current sharing circuit according to claim 13, wherein the current source reduces the magnitude of current injected into the plurality of the discharge resistors, so that a magnitude of a voltage of the first terminal of the discharge resistor is smaller than a voltage at first terminals of all phases in the multi-phase coupled device, and each discharge unit discharged the energy stored in the phase parallel with the discharge unit.

15. The forced current sharing circuit according to claim 9, wherein the forced current sharing circuit further comprises: a precision resistor;
the second terminals of all phases in the multi-phase coupled device are connected in parallel and then connected to a first terminal of the precision resistor, and a second terminal of the precision resistor is connected to an input terminal of the load;

the current detection unit detects the current output to the load by using the precision resistor, and generates a corresponding control signal according to whether the current is normal or abnormal, and sends the control signal to the current source.

16. The forced current sharing circuit according to claim 9, wherein the releasing unit comprises a diode;

an anode of the diode is connected to an input terminal of a parallel connection phase;

a cathode of the diode is respectively connected to the positive terminal of the current source and the first terminal of the discharge resistor.

17. The forced current sharing circuit according to claim 9, wherein the current source comprises a voltage-controlled current source.

18. The forced current sharing circuit according to claim 17, wherein the voltage-controlled current source comprises a resistor and a triode, a base of the triode receives the control signal, a collector of the triode is grounded, and an emitter of the triode is connected to the discharge resistor.

19. A motherboard, wherein the motherboard comprises the forced current sharing circuit according to claim 9;

the forced current sharing circuit is configured to force current sharing the output current of a power supply terminal in the motherboard to meet requirements of the power supply current of chips in the motherboard.

20. An electronic device, wherein the electronic device comprises the forced current sharing circuit according to claim 9;

the forced current sharing circuit is configured to force current sharing the output current of a power supply terminal in a motherboard in the electronic device to meet requirements of the power supply current of chips in the motherboard.

* * * * *